Patented Nov. 15, 1938

2,136,507

UNITED STATES PATENT OFFICE 2,136,507

DYESTUFFS OF THE SAFRANINE SERIES

Eugen Huber and Wolfram Vogt, Leverkusen-I. G. Werk, Germany, assignors to General Aniline Works, Inc., New York, N. Y., a corporation of Delaware No Drawing. Application January 5, 1934, Serial No. 705,456. In Germany January 14, 1933

5 Claims. (Cl. 260—266)

The present invention relates to new dyestuffs of the safranine series, more particularly it relates to acid safranine dyestuffs which may be represented by the probable general formula:

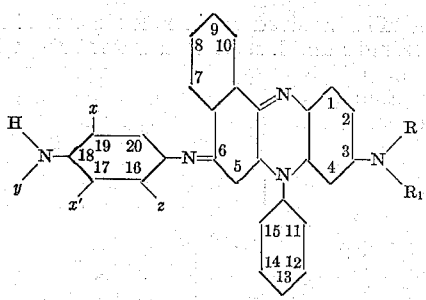

wherein $x$ stands for hydrogen or a neutral substituent, such as alkyl, alkoxy and halogen, and $x'$ stands for a neutral substituent in such a manner that $x'$ stands for alkyl when $x$ represents hydrogen, $y$ stands for hydrogen or a radical of the benzyl series or for acyl, such as benzyl which may bear substituents in the benzene nucleus, for instance, halogen, alkyl, the nitro group, the amino group and the sulfonic acid group, or for acetyl and benzoyl, or $y$ can stand for alkyl in case $x$ does not represent hydrogen, $z$ stands for hydrogen or the sulfonic acid group and R and $R_1$ stand for alkyl, aralkyl or aryl, such as methyl, ethyl, benzyl, phenyl, substituted benzyl or substituted phenyl, wherein the dyestuff molecule contains at least two sulfonic acid groups as substituents and may bear further substituents, such as alkyl, alkoxy, the carboxylic acid group, the sulfonic acid group, halogen and the like.

Our new dyestuffs, in which $y$ stands for hydrogen, are obtainable by starting with an isorosinduline-6-sulfonic acid of the general formula:

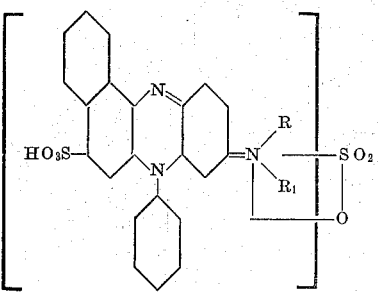

wherein R and $R_1$ mean the same as stated above and which may bear further substituents, and condensing with a p-phenylene-diamine of the general formula:

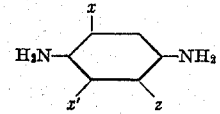

wherein $x$, $x'$ and $z$ mean the same as stated above, and if desired, sulfonating the dyestuffs obtained according to methods known per se.

Further our new dyestuffs, in which $y$ stands for hydrogen, are obtainable by starting with an isorosinduline of the general formula:

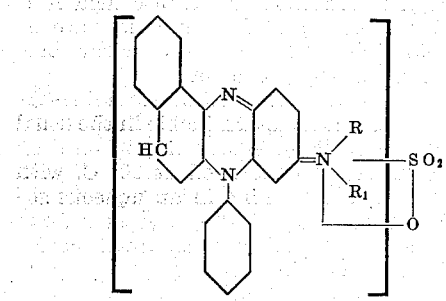

wherein R and $R_1$ mean the same as stated above, and condensing with a p-phenylenediamine compound of the general formula:

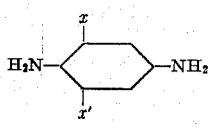

wherein $x$ and $x'$ mean the same as stated above, in the presence of an oxidizing agent, and if desired, treating the dyestuffs obtained with a sulfonating agent.

Those dyestuffs, in which $y$ stands for a benzyl radical or for an acyl radical, are obtained from the dyestuffs in which $y$ stands for hydrogen, by introducing into the amino group in the 18-position the benzyl group, substituted benzyl group or an acyl group.

If desired, the dyestuffs in which $y$ stands for hydrogen, benzyl or acyl, may be after-treated with a sulfonating agent. This manner of working is of technical value in case for the synthesis of our new dyestuffs there are used p-phenylenediamine compounds free from a sulfonic acid group.

The dyestuffs thus obtainable are in form of their alkali metal salts generally dark water soluble compounds, dyeing the fibre, especially the animal fibre, generally clear blue to greenish-blue shades of good fastness properties.

The invention is illustrated by the following examples, without being limited thereto:

*Example 1.*—The isorosindulinetrisulfonic acid, obtainable in the usual manner from $\frac{1}{10}$ gram-molecule of 4'-acetylamino-2'-sulfophenyl-β-naphthylamine and $\frac{1}{10}$ gram-molecule of 4-amino-diethylaniline-3-sulfonic acid and subsequently introducing a third sulfonic acid group by means of sodium bisulfite, is heated on the water bath with 15 grams of 2.6-dimethyl-1.4-diaminobenzene in an aqueous or dilute aqueous alcoholic solution with the addition of sodium acetate. On cooling, the dyestuff of the probable formula:

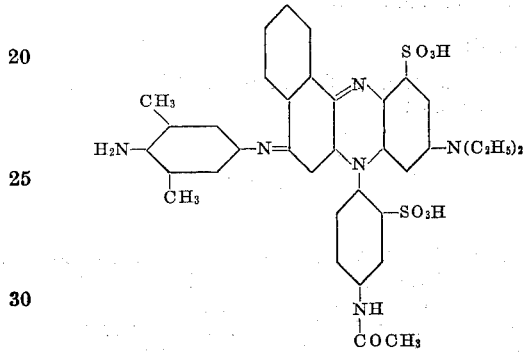

crystallizes. In concentrated sulfuric acid it is soluble with a green, in water with a clear greenish-blue coloration and dyes wool clear blue shades of good fastness properties.

*Example 2.*—The diethylisorosinduline-11-methyl-1,6-disulfonic acid, obtainable in the usual manner from $\frac{1}{10}$ gram-molecular proportion each of the components, is condensed at 80° C. with 15 grams of toluylenediamine in an aqueous solution with the addition of 20 grams of sodium acetate. The safranine thus obtained corresponding to the probable formula:

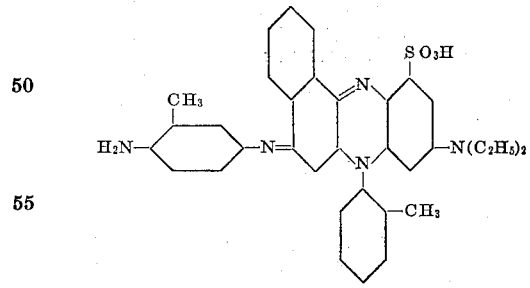

is heated with five times the quantity of an oleum of 20% strength, at 85° C., until a test portion is soluble in aqueous sodium acetate solution. By this sulfonation a sulfonic acid group probably enters the 16-position. The sulfonated dyestuff is soluble in concentrated sulfuric acid with a grass-green coloration, in water as sodium salt with a clear greenish-blue coloration, and dyes wool very clear blue shades of good fastness to light, alkali and washing.

*Example 3.*—$\frac{1}{10}$ gram-molecular proportion of the diethylisorosinduline-11-methyl-1,6-disulfonic acid is dissolved in dilute aqueous alcohol and heated with 15 grams of 2,6-dichloro-1,4-phenylenediamine with the addition of sodium acetate at about 80° C. The safranine thus obtained corresponding to the probable formula:

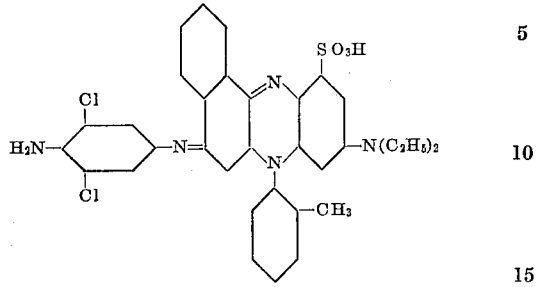

is sulfonated in the manner described in Example 2, whereby the sulfonic acid group probably enters the 16-position. The dyestuff is soluble in concentrated sulfuric acid with a grass-green coloration. It dyes wool very clear greenish-blue even shades of good fastness to light and washing.

*Example 4.*—$\frac{1}{10}$ gram-molecular proportion of 11-13-dichloro-diethylisorosinduline-1,6-sulfonic acid is dissolved in aqueous alcohol of about 45% strength and heated on a water bath with 15 grams of 1,4-diamino-2,6-dimethylbenzene with the addition of sodium acetate. The dyestuff obtained corresponds to the probable formula:

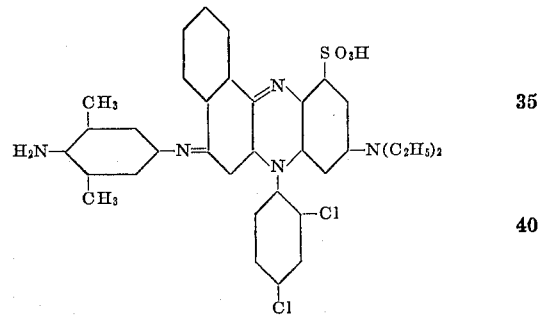

It is sulfonated in the same manner as described in Example 2, whereby the sulfonic acid group probably enters the 16-position. The sulfonated dyestuff is soluble in concentrated sulfuric acid with a green, in water with a clear greenish-blue coloration, and dyes wool very clear greenish-blue even shades of good fastness to light and washing.

*Example 5.*—$\frac{1}{10}$ gram-molecular proportion of 11-methyl-diethylisorosinduline-1,6-disulfonic acid is heated in aqueous solution with 25 grams of 2,6-dimethyl-1,4-diaminobenzene-3-sodium-sulfonate at about 80–90° C. and in the presence of sodium acetate. The dyestuff obtained corresponds to the probable formula:

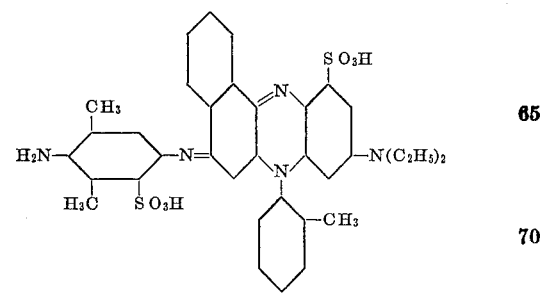

It dyes wool very clear greenish-blue shades of good fastness to alkali, washing and light.

The dyestuff prepared in an analogous manner of the probable formula:

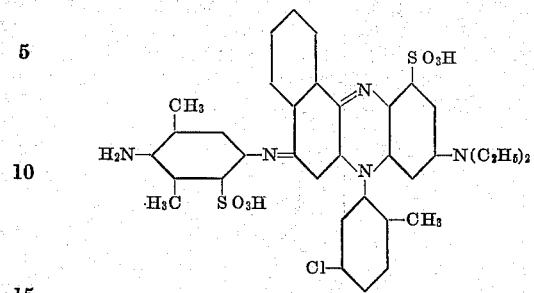

exerts similar properties.

Example 6.—The dyestuff obtained in accordance with Example 5, paragraph 1, is transformed into its 18-N-benzyl-derivative by treating in aqueous solution or aqueous alcoholic solution with benzylchloride in the presence of an acid-binding agent, such as sodium bicarbonate, soda or sodium acetate. The dyestuff thus obtained corresponds in its free state to the probable formula:

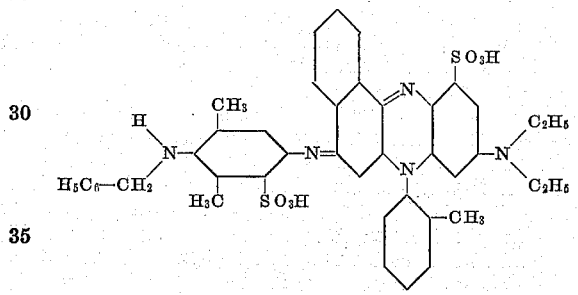

It dyes wool greenish-blue shades of good fastness properties.

Dyestuffs having similar properties are obtained when substituting the benzylchloride by a nitro(o-, m-, p-)-benzylchloride or by p-chloro- or 2,4-dichloro-benzylchloride. In the dyestuffs containing the nitrobenzyl group attached to the nitrogen atom in the 18-position, the nitro group can be reduced in the usual manner to the amino group.

Example 7.—By treating the dyestuff described in Example 5, paragraph 1, with acetic acid anhydride in acetic acid solution, the amino group in 18-position is acetylated yielding a dyestuff of the probable formula:

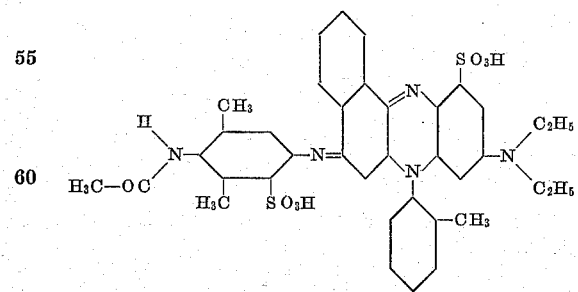

dyeing wool reddish blue shades of good fastness properties.

Dyestuffs of similar properties are obtained when introducing instead of an acetyl group a benzoyl group, for example, with benzoylchloride, or a toluene sulfo group with p-toluene-sulfochloride.

Example 8.—By treating the dyestuff of Example 5, paragraph 1, in aqueous solution with dimethylsulfate in the presence of an acid-binding agent, a methyl group enters the amino group in 18-position, yielding a dyestuff dyeing wool greenish-blue shades of good fastness properties.

Example 9.—In an analogous manner as described in Example 5, paragraph 1, there is prepared a dyestuff having in the free state the following formula:

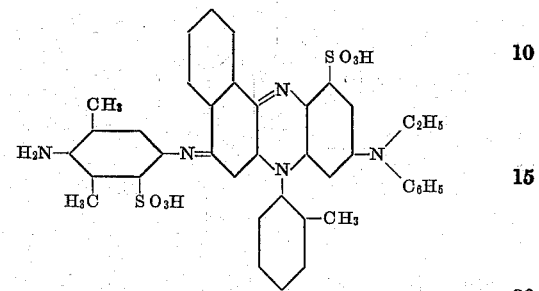

dyeing wool reddish-blue shades of good fastness properties.

Example 10.—In an analogous manner as described in Example 5, paragraph 1, there is prepared a dyestuff having in the free state the following formula:

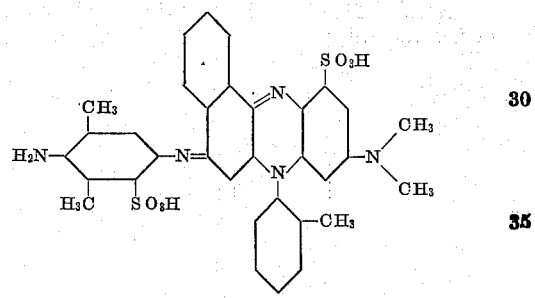

dyeing wool greenish-blue shades of good fastness properties.

Example 11.—In an analogous manner as described in Example 5, paragraph 1, there is prepared a dyestuff having in the free state the following formula:

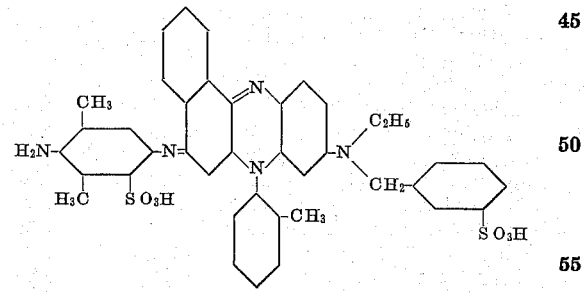

dyeing wool blue shades of good fastness properties.

Example 12.—In an analogous manner as described in Example 5, paragraph 1, there is prepared a dyestuff having in the free state the following formula:

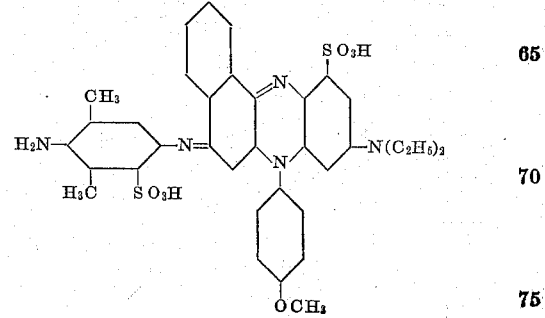

dyeing wool greenish-blue shades of good fastness properties.

*Example 13.*—In an analogous manner as described in Example 5, paragraph 1, there is obtained a dyestuff having in the free state the following formula:

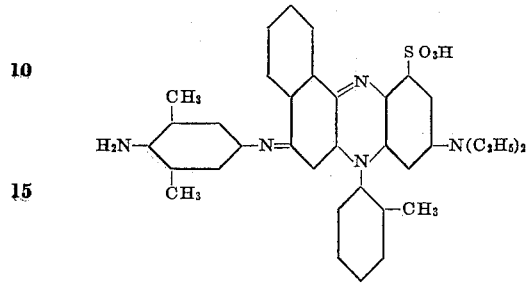

This dyestuff is benzylated in the amino group in the 18-position as described in Example 6, and finally sulfonated as described in Example 2, whereby probably a sulfonic acid enters the benzene nucleus of the benzyl group and, possibly, a second sulfonic acid group enters the 16-position.

*Example 14.*—The isorosindulinesulfonic acid of the formula:

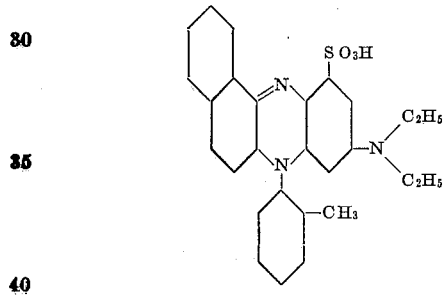

is stirred in aqueous alcohol of 50% strength with the addition of caustic soda at 20–50° C. with 3,5-dimethyl-p-phenylenediamine, until a test portion is soluble in concentrated sulfuric acid with a clear greenish coloration. By sulfonating the dyestuff thus obtained, there is formed a dyestuff having the same properties as the sulfonated dyestuff of Example 5.

*Example 15.*—The isorosindulinesulfonic acid of Example 14 is stirred in aqueous pyridine of 50% strength with methyl-p-phenylenediamine and with the addition of nitrobenzene as oxidizing agent and of caustic soda, until a test portion dissolves in sulfuric acid with a clear green coloration. The product is sulfonated, and the dyestuff thus obtained corresponds to that described in Example 2.

A dyestuff having similar properties is obtained when using 3,5-dichloro-p-phenylenediamine instead of methyl-p-phenylenediamine.

We claim:

1. The acid safranine dyestuff having in the free state the following formula:

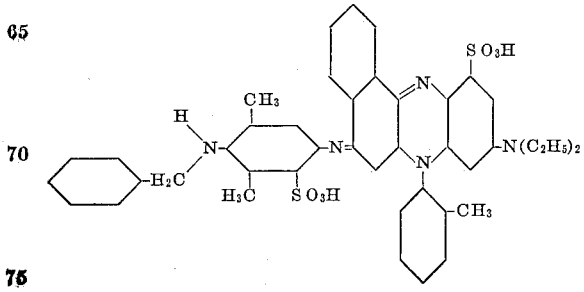

being soluble in concentrated sulfuric acid with a grass-green coloration, in water in form of its sodium salt with a clear greenish-blue coloration, and dyeing wool greenish-blue shades of good fastness to light, alkali and washing.

2. Acid safranine dyestuffs of the group consisting of dyestuffs of the general formula:

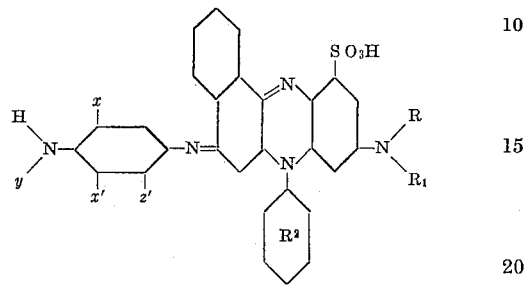

wherein $x$ and $x'$ are selected from the group consisting of hydrocarbon alkyl and halogen, $y$ is selected from the group consisting of hydrogen and benzyl, $z$ is selected from the group consisting of hydrogen and sulfonic acid group, R and $R_1$ are selected from the group consisting of hydrocarbon alkyl radicals, benzyl radicals and phenyl radicals and such dyestuffs substituted in the benzene nucleus $R_2$ by a substituent selected from the group consisting of halogen, hydrocarbon alkyl, acetylamino, alkoxy and the sulfonic acid group, the substituents being so chosen that the compound contains at least two sulfonic acid groups in the dyestuff molecule, being in the form of their alkali metal salts generally dark water-soluble compounds, dyeing the fibre, especially the animal fibre, generally clear blue to greenish blue shades of good fastness properties.

3. Acid safranine dyestuffs of the group consisting of dyestuffs of the general formula:

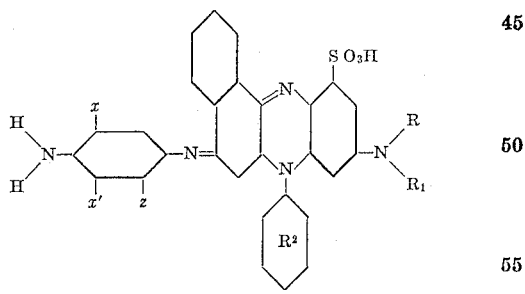

wherein $x$ and $x'$ are selected from the group consisting of hydrocarbon alkyl and halogen, $z$ is selected from the group consisting of hydrogen and the sulfonic acid group and R and $R_1$ stand for hydrocarbon alkyl groups containing less than three carbon atoms and such dyestuffs substituted in the benzene nucleus $R_2$ by a substituent selected from the group consisting of halogen, hydrocarbon alkyl, acetylamino, alkoxy and the sulfonic acid group, the substituents being so chosen that the compound contains at least two sulfonic acid groups in the dyestuff molecule, being in the form of their alkali metal salts generally dark, water-soluble compounds, dyeing the fibre, especially the animal fibre, generally clear blue to greenish blue shades of good fastness properties.

4. Acid safranine dyestuffs of the group consisting of dyestuffs of the general formula:

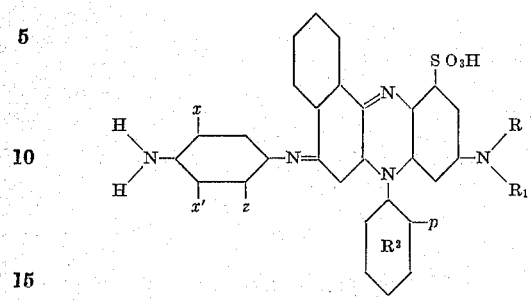

wherein $x$ and $x'$ are selected from the group consisting of hydrocarbon alkyl and halogen, $z$ is selected from the group consisting of hydrogen and the sulfonic acid group, $p$ is selected from the group consisting of methyl and chlorine and R and $R_1$ stand for hydrocarbon alkyl groups containing less than three carbon atoms and such dyestuffs substituted in the benzene nucleus $R_2$ by a substituent selected from the group consisting of halogen, hydrocarbon alkyl, acetylamino, alkoxy and the sulfonic acid group, the substituents being so chosen that the compound contains at least two sulfonic acid groups in the dyestuff molecule, being in the form of their alkali metal salts generally dark water-soluble compounds, dyeing the fibre, especially the animal fibre, generally clear blue to greenish blue shades of good fastness properties.

5. Acid safranine dyestuffs of the group consisting of dyestuffs of the general formula:

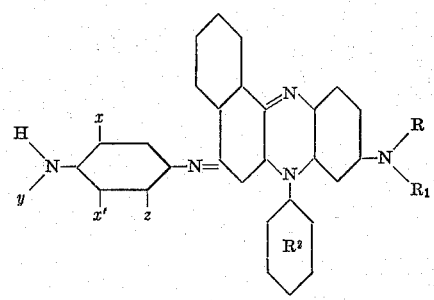

wherein $x$ and $x'$ are selected from the group consisting of hydrocarbon alkyl and halogen, $y$ is selected from the group consisting of hydrogen and benzyl, $z$ is selected from the group consisting of hydrogen and the sulfonic acid group, R and $R_1$ are selected from the group consisting of hydrocarbon alkyl radicals, benzyl radicals and phenyl radicals and such dyestuffs substituted in the benzene nucleus $R_2$ by a substituent selected from the group consisting of halogen, hydrocarbon alkyl, acetylamino, alkoxy and the sulfonic acid group, and wherein the dyestuff molecule contains at least two sulfonic acid groups as substituents, being in the form of their alkali metal salts generally dark water-soluble compounds, dyeing the fibre, especially the animal fibre, generally clear blue to greenish blue shades of good fastness properties.

EUGEN HUBER.
WOLFRAM VOGT.